(12) United States Patent
Lin

(10) Patent No.: US 6,716,777 B2
(45) Date of Patent: Apr. 6, 2004

(54) FABRIC STRUCTURE FOR MAKING BAGS AND THE LIKE

(75) Inventor: Chun-Wei Lin, Taichung (TW)

(73) Assignee: Epitech Inc., Taichung (TW)

(*) Notice: Subject to any disclaimer, the term of this patent is extended or adjusted under 35 U.S.C. 154(b) by 20 days.

(21) Appl. No.: 09/986,336

(22) Filed: Nov. 8, 2001

(65) Prior Publication Data

US 2003/0087570 A1 May 8, 2003

(51) Int. Cl.[7] .............. B32B 5/02; B32B 27/04; B32B 27/00; D03D 15/00
(52) U.S. Cl. .............. 442/188; 442/62; 442/64; 442/66; 442/69; 442/70; 442/71; 442/72; 442/73; 442/74; 442/75; 442/152; 442/153; 428/423.5; 428/423.7; 428/423.9; 428/424.8; 428/425.1
(58) Field of Search .............. 442/64, 66, 69, 442/188, 70–75, 152, 153, 62, 71, 86; 428/411.1, 423.5, 423.7, 423.9, 424.8, 425.1

(56) References Cited

U.S. PATENT DOCUMENTS

| | | | |
|---|---|---|---|
| RE28,682 E | * | 1/1976 | Hoey .............. 428/196 |
| 4,753,840 A | | 6/1988 | Van Gompel |
| 5,164,240 A | | 11/1992 | Burgess et al. |
| 2003/0027474 A1 | * | 2/2003 | Hayes .............. 442/149 |

FOREIGN PATENT DOCUMENTS

| | | |
|---|---|---|
| EP | 0 446 431 A2 | 9/1991 |
| EP | 0 781 646 A1 | 7/1997 |

* cited by examiner

Primary Examiner—Elizabeth M. Cole
Assistant Examiner—Lynda M. Salvatore
(74) Attorney, Agent, or Firm—Browdy and Neimark

(57) ABSTRACT

A fabric structure is constructed having a fabric base sheet, a viscidity layer, a polymeric back layer, and a protective layer. The polymeric back layer is prepared from SBC (styrenic block copolymer) for the advantage of low specific gravity and preventing the drawback of PVC or the like that pollutes the environment when disposed off. The protective layer is prepared from PU series or modified SBC (styrenic block copolymer) series agent. When the fabric structure used to make a bag, the front surface of the fabric base sheet is disposed outside the bag and the surface of the protective layer is disposed inside the bag.

8 Claims, 8 Drawing Sheets

FABRIC STRUCTURE FOR MAKING BAGS AND THE LIKE

FIELD OF THE INVENTION

The present invention relates generally to products of bags and cases, and more particularly to a fabric structure for making bags and the like and the manufacturing method thereof.

BACKGROUND OF THE INVENTION

Various fabric materials have been developed for use in making travel bags, sports bags, backpacks, and the like for the advantage of lightweight, comfortable touch, ease of processing, and low cost. In early days, fabric sheet materials were directly used to make bags through cutting and stitching procedures. However, because a single layer of fabric sheet material is not waterproof, it is not acceptable to most consumers. In order to eliminate this problem, a polymeric backing layer is needed. Conventionally, PVC (polyvinyl chloride) is used for the polymeric backing layer. However, when burned, PVC produces dioxin and other toxic gases that are harmful to the human beings and the environment. Due to this pollution problem, PVC is not the best choice for making the polymeric backing layer. Further, due to high specific gravity (about 1.3), PVC is not suitable for making lightweight bags. Other polymeric materials including PE (polyethylene), EVA (ethylene-vinyl-acetate copolymer), or the combination of PE and EVA may be used for making the polymeric backing layer. However, these materials have low flexibility and poor touch. When folded up, a permanent fold line may be left. Due to the mentioned drawbacks, these materials are rarely used for making bags and cases.

SUMMARY OF THE INVENTION

The primary object of the present invention is to provide a fabric structure for making bags and the like, which uses SBC (styrenic block copolymer) for the polymeric backing layer instead of potential pollutants such as PVC.

It is another object of the present invention to provide a fabric structure, which has high flexibility.

It is another object of the present invention to provide a fabric structure, which has a low specific gravity suitable for making lightweight bags and the like.

It is still another object of the present invention to provide a fabric structure, which is waterproof and, has a nice touch.

It is still another object of the present invention to provide a fabric structure, which has its protective layer prepared subject to the desired color.

To achieve the above mentioned objects of the present invention, the fabric structure comprises a fabric base sheet, the fabric base sheet having a front surface adapted to be disposed on the outside of the bag to be made and a back surface; a polymeric backing layer containing SBC (styrenic block copolymer), the polymeric backing layer having a front bonding surface bonded to the back surface of the fabric base sheet and a back surface; and a protective layer prepared from a surface treatment agent and coated on the polymeric backing layer, the protective layer having an inner surface bonded to the back surface of the polymeric backing layer and an outer surface adapted to be disposed to the inside of the bag to be made.

DETAILED DESCRIPTION OF THE INVENTION

Figure 1:
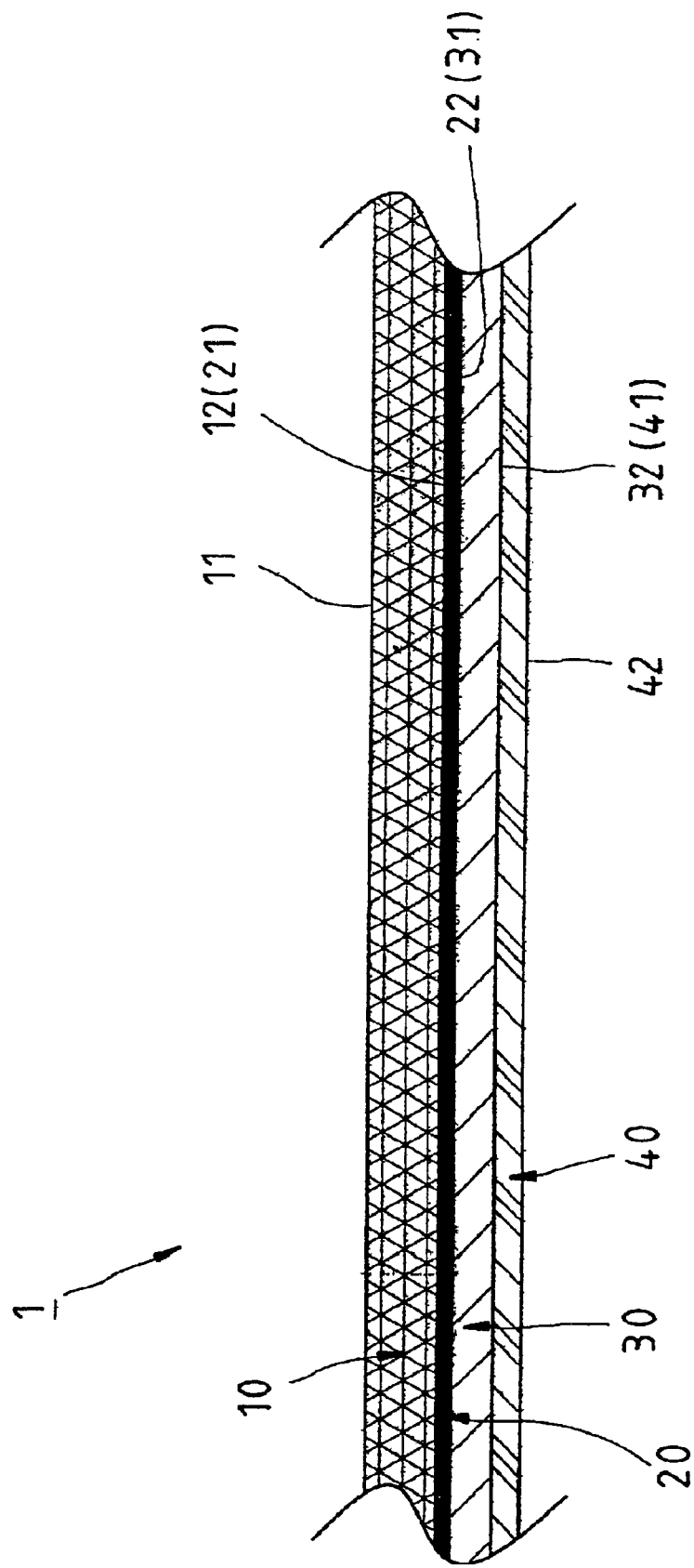
FIG. 1 is a sectional view of a fabric structure constructed according to a preferred embodiment of the present invention.

Referring to FIG. 1, a fabric structure 1 of a preferred embodiment of the present invention is shown comprised of a fabric base sheet 10, a viscous layer 20, a polymeric backing layer 30, and a protective layer 40.

The fabric base sheet 10 is a woven fabric of nylon or polyester, having a front surface 11 and a back surface 12.

The viscous layer 20 is prepared subject to a particular formula containing SBC (styrenic block copolymer), viscosity improver, additive, and processing oil or butanone. The prepared bonding material is evenly applied to the fabric base sheet 10, forming the desired viscidity layer 20. The viscous layer 20 has a first surface 21 and a second surface 22. The first surface 21 of the viscous layer 20 is bonded to the back surface 12 of the fabric base sheet 10.

The polymeric backing layer 30 is prepared from a mixture containing SBC (styrenic block copolymer), processing oil, plastics, and additive. SBC can be obtained from either or a combination of the following four items:

(1) SBS (styrene-butadiene-styrene block copolymer);
(2) SEBS (styrene-ethylene-butylene-styrene block copolymer);
(3) SIS (styrene-isoprene-styrene block copolymer);
(4) SEPS (styrene-ethylene-propylene-styrene block copolymer).

The polymeric backing layer 30 is coated on the viscous layer 20, having a front bonding surface 31 and a back surface 32. The front surface 31 of the polymeric backing layer 30 is bonded to the second surface 22 of the viscous layer 20.

The protective layer 40 is prepared from a PU (urethane polymer) surface treatment agent and coated on the polymeric backing layer 30, having an inner surface 41 and an outer surface 42. The inner surface 41 of the protective layer 40 is bonded to the back surface 32 of the polymeric back layer 30. The PU surface treating agent contains polyurethane resin, DMF (dimethyl formamide), MEK (methyl ethyl ketone), TOL (toluene), silica, and silicone oil. Further, pigment may be added to the surface treatment agent to provide a colored protective layer.

The aforesaid statement describes the construction of the fabric structure 1. When used to make bags or the like, the front surface 11 of the fabric base sheet 10 is exposed to the outside, and the outer surface 42 of the protective layer 40 faces the inside of the finished product.

The advantages of the fabric structure 1 are outlined hereinafter.

(1) Because the polymeric backing layer 30 contains mainly SBC (styrenic block copolymer), the fabric structure 1 eliminates the problem of producing dioxin as encountered in conventional PVC (polyvinyl chloride) based fabric materials when burned.

(2) Because the additive used in the SBC-based polymeric backing layer 30 to change the physical properties of the SBC-based polymeric backing layer 30 does not contain any heavy metals, it does not cause pollution to the environment and, enables the physical properties of the SBC-based polymeric backing layer 30 to be easily adjusted to facilitate the performance of further processing procedure.

(3) Because the SBC-based polymeric backing layer 30 provides good flexibility and elasticity, the fabric structure 1 prevents the formation of a fold line, which is commonly seen in conventional plastic back materials (PE, EVA) when folded up).

(4) Because the specific gravity of SBC is about 0.9, lower than the specific gravity 1.3 of PVC, it fits the demand of making finished products as light as possible.

(5) The SBC-based polymeric backing layer 30 is waterproof, providing the function of fixing and reinforcing the construction of the fabric material.

(6) The PU protective layer 40 prevent the SBC-based polymeric backing layer 30 from becoming viscous when hot during delivery, keeping the surface of the fabric structure 1 dry for stitching and comfortable for touching and, preventing the surface of the fabric structure 1 from been covered with scratches.

(7) The PU protective layer 40 can be added with pigment during its preparation, so as to provide the desired color without further complicated and expensive dying procedure. No pigment is needed when making the PU protective layer 40 transparent.

Figure 2:
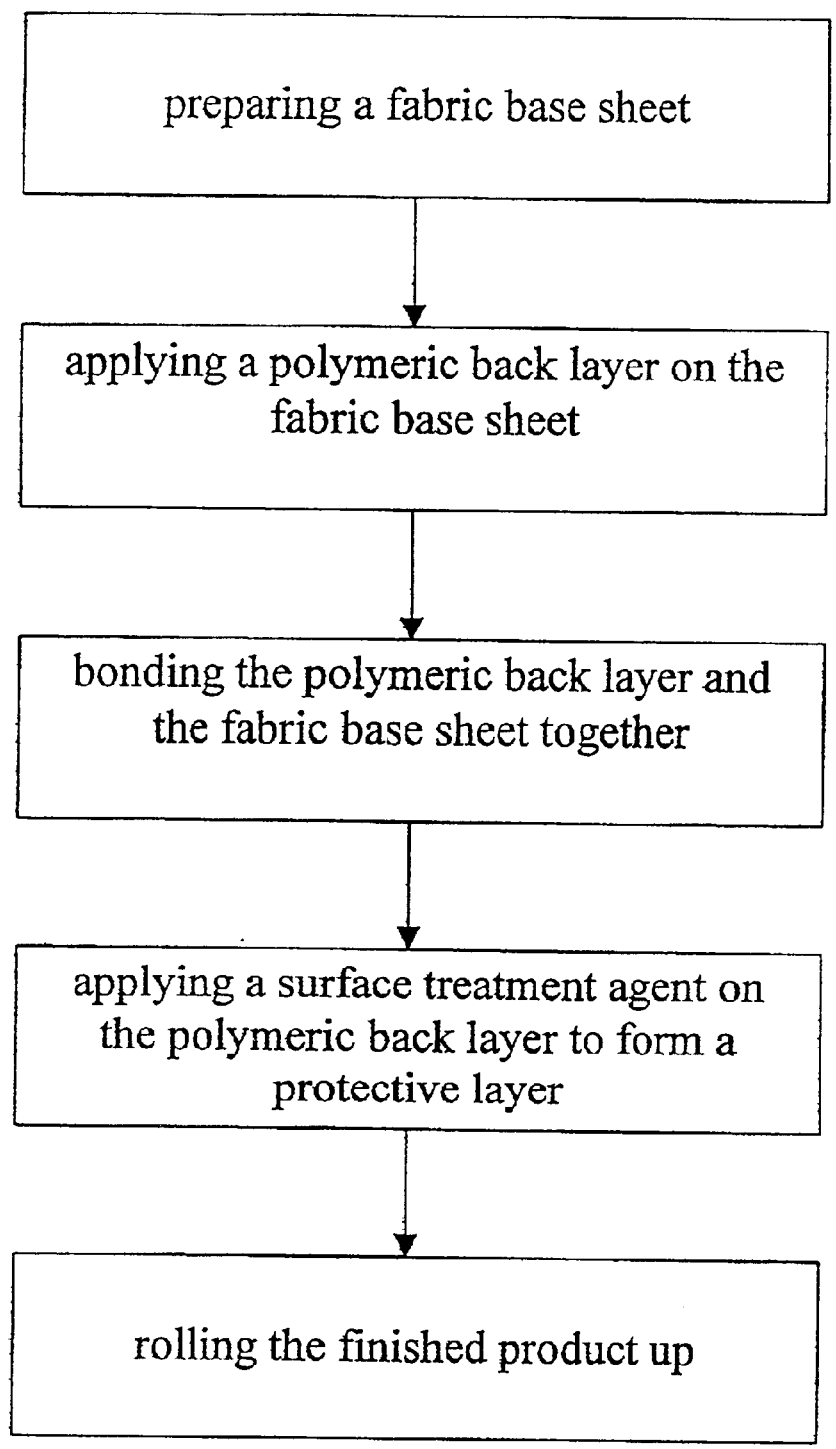
FIG. 2 is a block diagram explaining the fabrication flow of the fabric structure according to the preferred embodiment of the present invention.

Referring to FIG. 2, the fabrication of the fabric structure 1 includes the steps of preparing the fabric base sheet preparation, applying polymeric backing layer onto the base sheet, bonding the polymeric backing layer and the base sheet together, applying surface treatment agent to the polymeric backing-layer to from a protective layer, and rolling the finished product up. Various manufacturing methods are outlined hereinafter.

Figure 3:
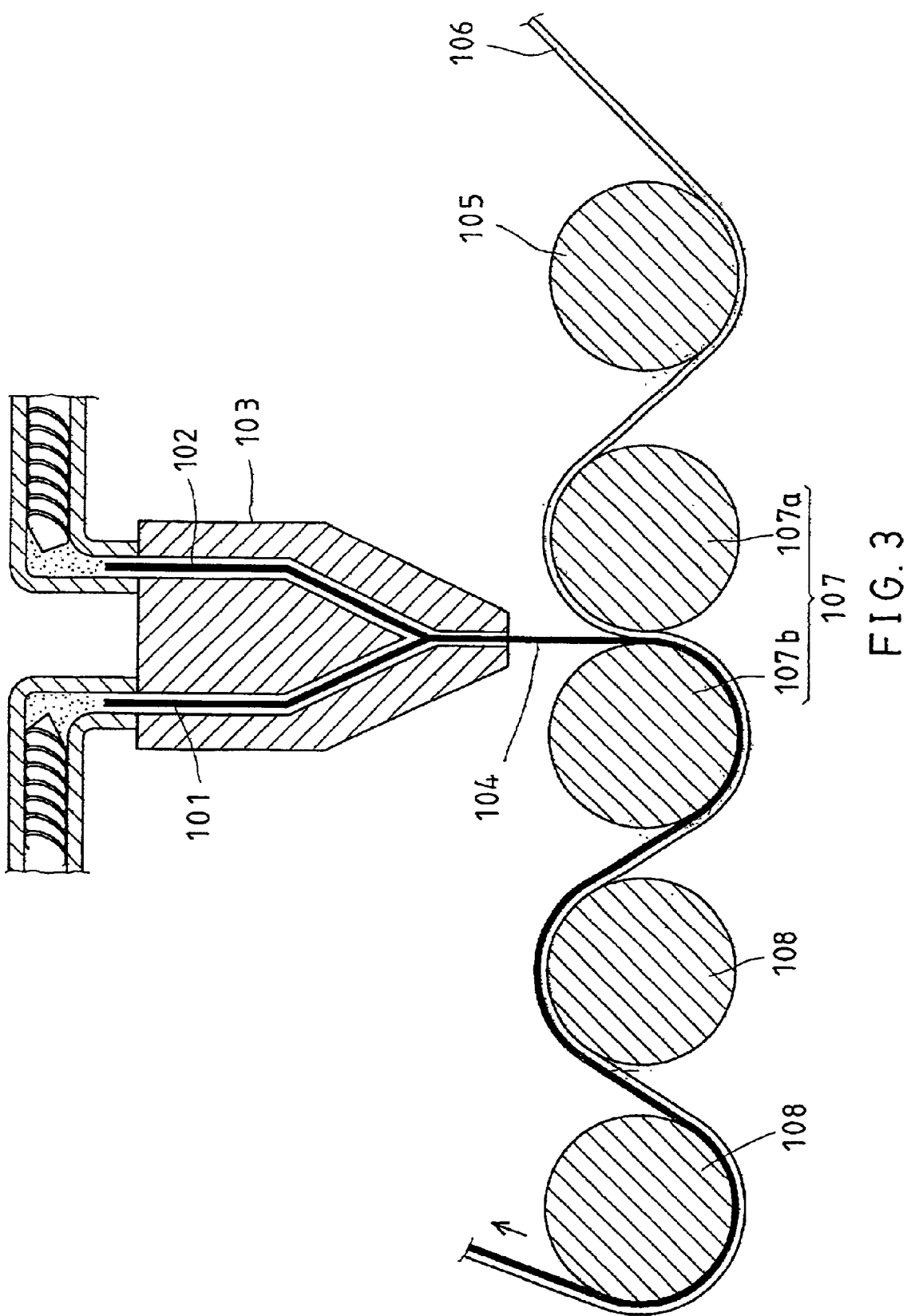
FIG. 3 is a schematic drawing showing the polymeric backing layer being bonded to the fabric base sheet by means of co-extrusion coating procedure.

Please refer to FIG. 3, as it discloses how a viscous layer and a polymeric backing layer are formed on a fabric base sheet by means of a so-called co-extrusion coating procedure. As shown in FIG. 3, SBC-based polymeric back material 101 is prepared containing SBC (100 PHR), processing oil (0~120 PHR), plastics (0~100 PHR), and additive (0~20 PHR), and viscous material 102 is prepared containing SBC (100 PHR), processing oil (0~25 PHR), viscosity improver (0~120 PHR), and additive (0~20 PHR). The SBC-based polymeric material 101 and the viscous material 102 are separately fed into a lamination machine and heated at different temperatures and treated through respective fusion, cutting, and mixing procedures, and then delivered to a respective T-mold 103 through a respective fluid path. The temperature for the polymeric backing layer material is set at about 80~200° C., or preferably at 170~180° C., so as to obtain melt flow index within 5~18 g/10 min and, to achieve better wetting effect. The temperature for the viscous material is set at about 80~200° C., or preferably at 180~200° C.

The SBC-based polymeric backing layer material 101 and the viscous material 102 are gathered in the T-mold 103 at about 3 mm~5 mm from the output port of the T-mold 103, so that the SBC-based polymeric back material 101 and the viscous material 102 are fused together and squeezed into a SBC-based polymeric backing layer 104. The thickness of the SBC-based polymeric backing layer 104 is within about 0.05 mm~0.6 mm, The SBC-based polymeric back layer 104 is then covered on a fabric base sheet 106 being delivered from an anterior roller set (including a preheating roller) 105, and then delivered with the fabric base sheet 106 through an impression roller set 107 (including a silicon rubber roller 107a and an impression roller 107b), and then continuously delivered forwards through a posterior cooling roller set 108. When cooled down, the desired semi-finished fabric material is obtained. The method of using a roller to preheat or cool down the sheet material is to heat the roller, or to deliver freezing water through the roller. Because the application of the heater or freezing water is not within the scope of the present invention, no further detailed description is necessary.

Figure 4:
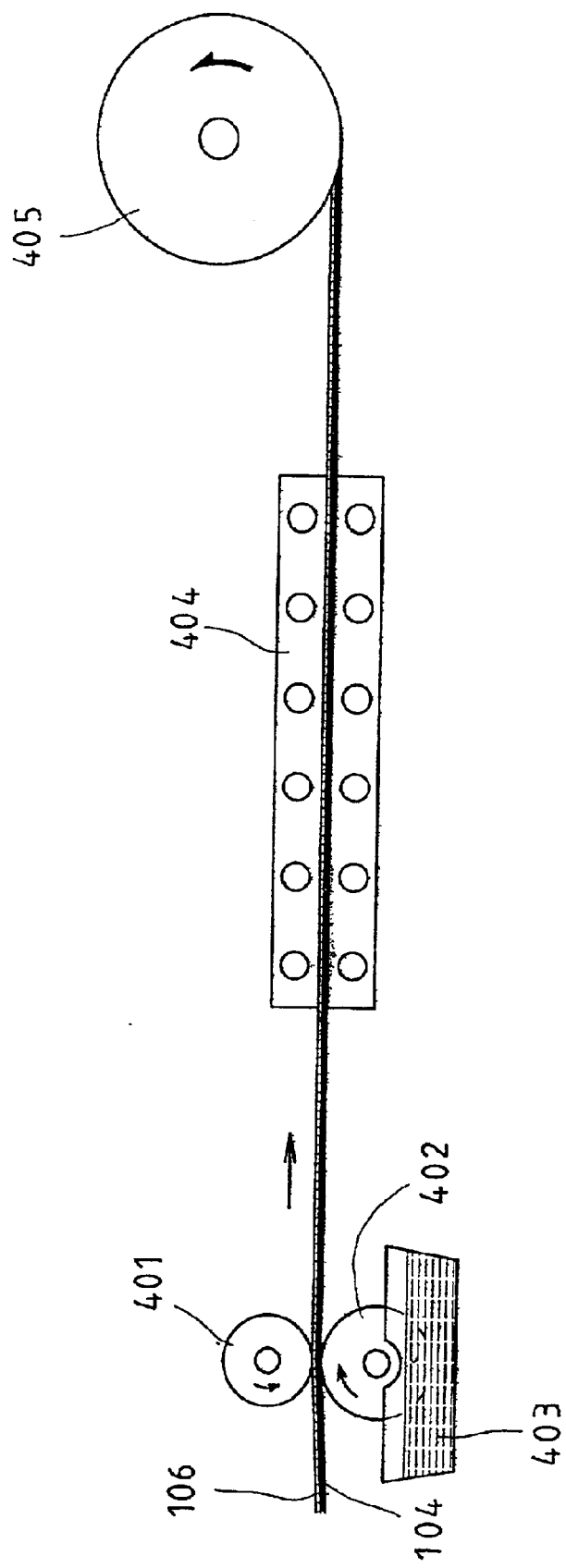
FIG. 4 is a schematic drawing showing the steps of surface treating and finished product rolling-up according to the preferred embodiment of the present invention.

Referring to FIG. 4, during the step of surface treating, the semi-finished fabric material thus obtained is inserted in between a sheet-transfer roller 401 and an applicator roller 402, and then delivered forwards through a baking oven 404 and then rolled up by a rolling-up roller 405. The applicator roller 402 is partially dipped in a PU (urethane polymer) surface treatment fluid 403. When passing through the gap in between the sheet-transfer roller 401 and an applicator roller 402, the SBC-based polymeric backing layer 104 of the semi-finished sheet material is evenly coated with a layer of PU (urethane polymer) surface treatment fluid 403 by the applicator roller 402. When passed through the baking oven 404, the layer of PU (urethane polymer) surface treatment fluid 403 is dried. When dried, the solvent which is contained in the PU surface treatment fluid is volatilized, and the solid content forms a protective layer on the finished fabric material (fabric structure), and the rolling-up roller 405 is rotated to roll up the finished fabric material (fabric structure).

The aforesaid PU (urethane polymer) surface treatment fluid 403 contains PU resin 5~15 wt %, DMF (dimethyl formamide) 20~40 wt %, MEK (methyl ethyl ketone) 20~40 wt %, TOL (toluene) 20~40 wt %, silica 0~5 wt %, and silicone oil 0~3%. The aforesaid solvent includes DMF, MEK, and TOL. The aforesaid solid content includes PU resin, silica, and silicone oil. Further, pigment may be added to the PU (urethane polymer) surface treatment fluid 403 to change the color of the backing layer. The content of pigment is about 0~15 wt %.

Further, modified SBC surface treatment fluid may be used instead of the aforesaid PU surface treatment fluid 403. The modified SBC surface treatment fluid includes two types, namely, the silicone-based modified SBC surface treatment fluid and the wax-based SBC surface treatment fluid. The former contains SBC 5~30 wt %, silicone 0.5~10 wt %, IPA (isophthalic acid) 1~7 wt %, TPT (tetraisopropyl titanate) 0.1~0.5 wt %, and toluene 60~90 wt %. The later contains SBC 5~30 wt %, wax and toluene 60~90%. The wax used herein can be PE wax or Teflon wax, and its content is within about 1~5 wt %.

Of course, pigment may be added to the modified SBC surface treatment fluid to produce the desired color of protective layer.

Either of PU (urethane polymer) surface treatment fluid or modified SBC surface treatment fluid can achieve the desired protective layer having scratch-protective smooth features.

Figure 5A:
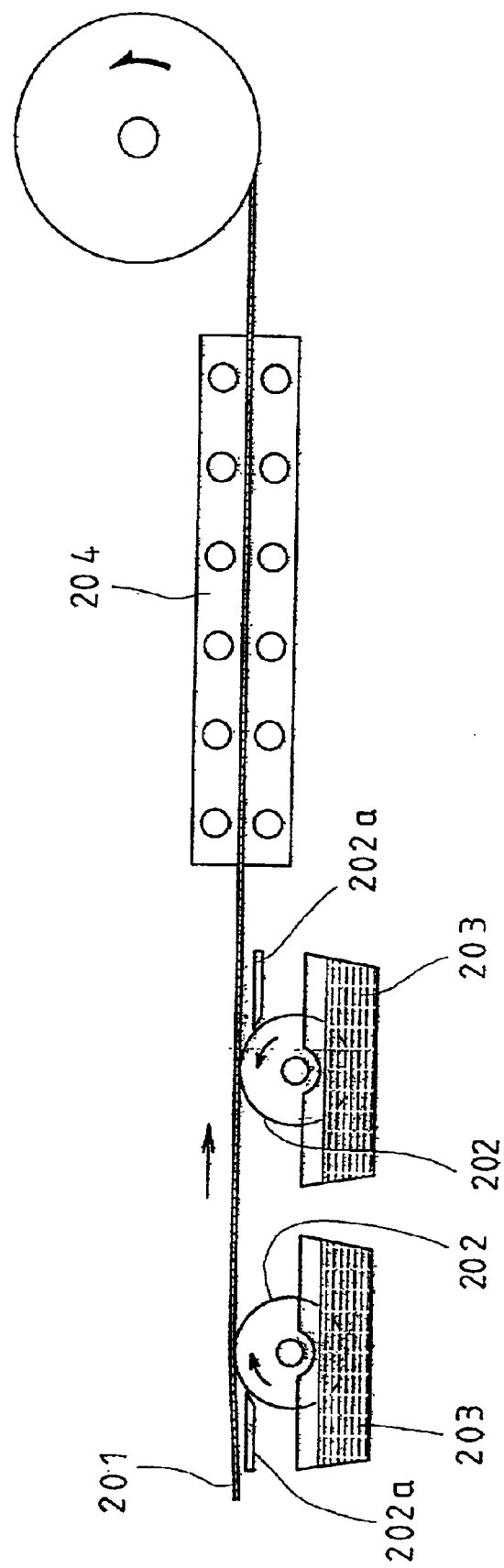
FIGS. 5A and 5B are schematic drawings showing how to apply a viscidity layer on the surface of the fabric base sheet and how the polymeric backing layer is bonded to the fabric base sheet by means of extrusion coating procedure.
Figure 5B:
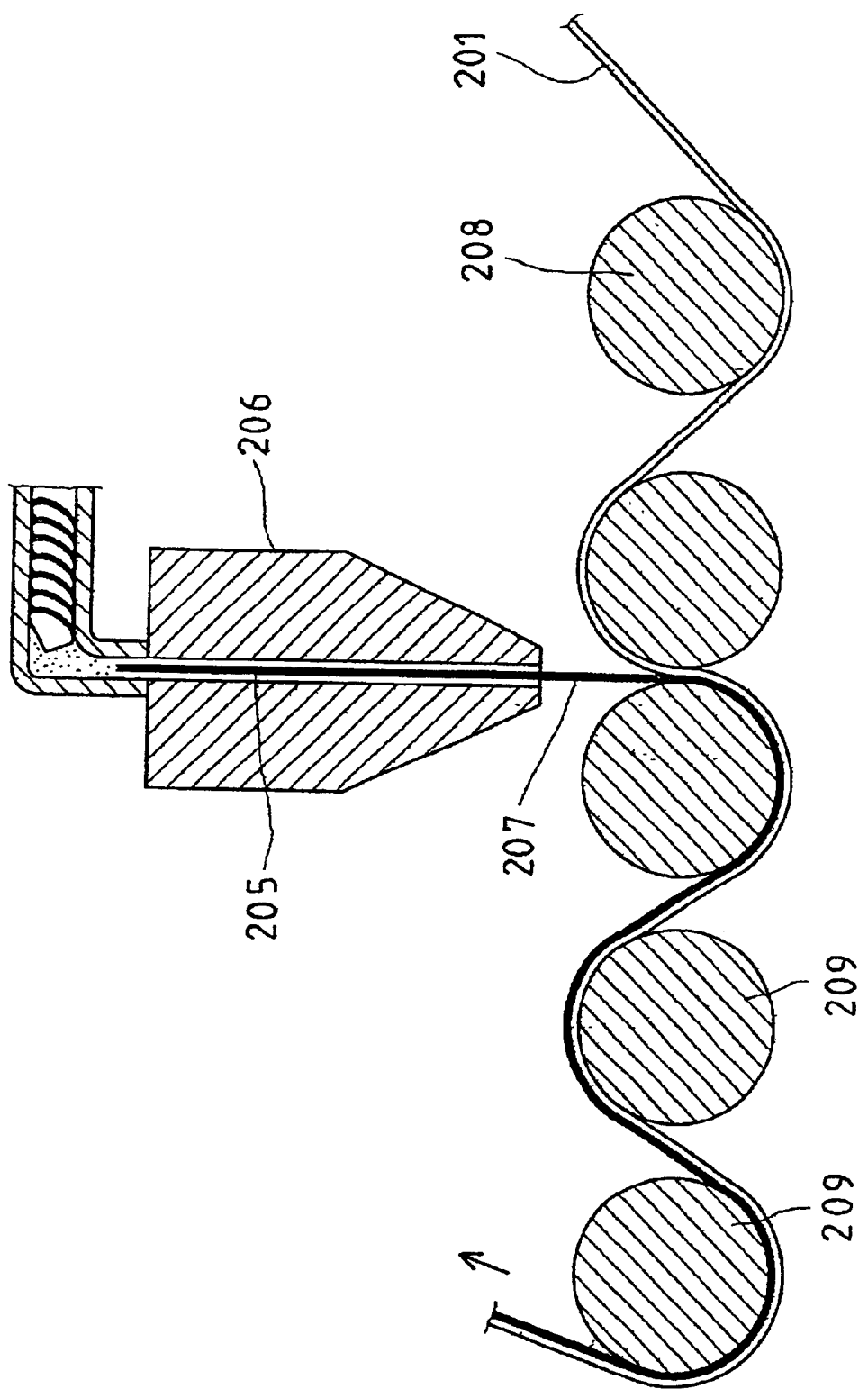

FIG. 5 shows an alternate form of the fabrication process for making the desired fabric structure. This alternate form employs an extrusion coating process. As shown in FIG. 5A, the fabric base sheet 201 is delivered over at least one applicator roller 202, which applies a viscous material 203 to one surface of the fabric base sheet 201. Further, a scraper 202a is used with each applicator roller 202, and adapted to remove excessive amount of viscous material 203 from the corresponding applicator roller 202. The viscous material 203 contains SBC (100 PHR), viscosity improver (0~120 PHR), additive (0~20 PHR), and MEK (100~500 PHR). When coated with the viscous material 203, the fabric base sheet 201 is delivered forwards through a baking oven 204, enabling the solvent in the viscous material to be volatized. When dried, the fabric base sheet 201 coated with the viscous layer is rolled up for further polymeric backing layer bonding. As shown in FIG. 5B, SBC-based polymeric backing material 205 is prepared containing SBC (100 PHR), processing oil (0~120 PHR), plastics (0~100 PHR), and additive (0~20 PHR). The prepared SBC-based polymeric backing material 205 is then supplied to a lamination machine and heated to about 170~180° C. to achieve a melt flow index of 5~18 g/10 min. The molten fluid of the prepared SBC-based polymeric backing material 205 is well mixed and propelled to a T-mold 206 and squeezed out of the output port of the T-mold 206, forming a continuous sheet of SBC-based polymeric backing film 207. The continuous sheet of SBC-based polymeric backing film 207 is then covered on the viscous layer 203 of the fabric base sheet 201 which has been delivered from an anterior roller set 208. After pressure bonding, the continuous sheet of SBC-based polymeric backing film 207 and the fabric base sheet 201 are fastened together, forming the a semi-finished product (fabric structure), which is cooled down through a posterior roller set 209, and then treated through a PU (urethane polymer) surface treatment (same as that shown in FIG. 4).

Figure 6A:
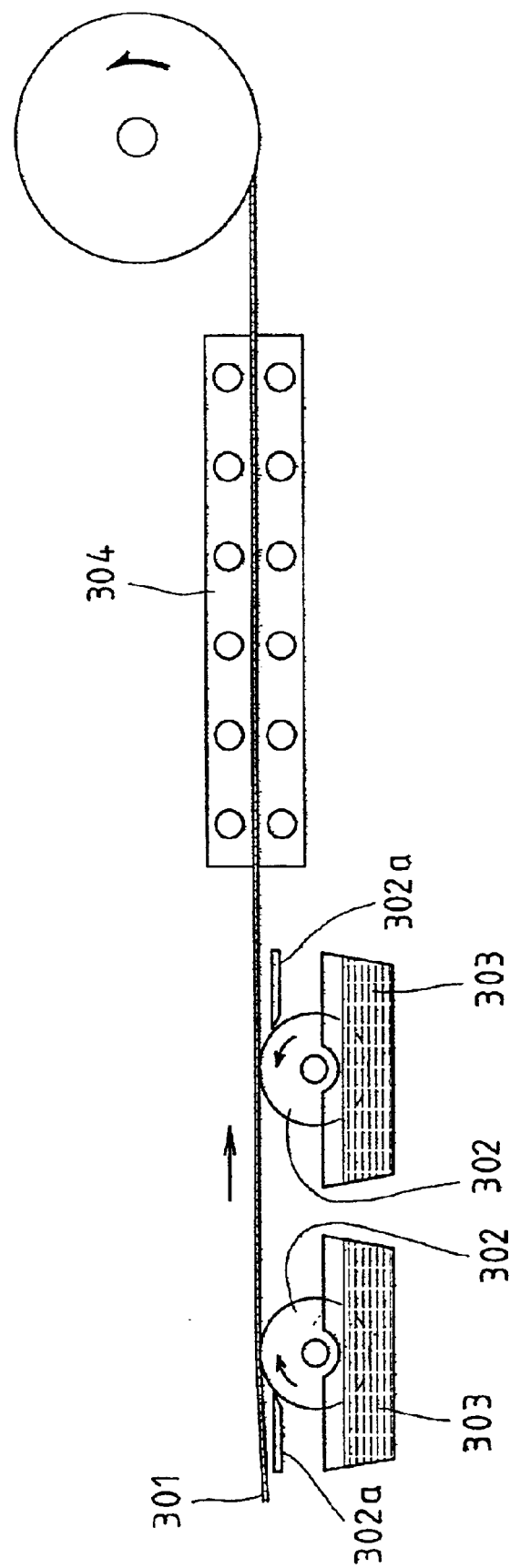
FIGS. 6A and 6B are schematic drawings showing how to apply a viscous layer on the surface of the fabric base sheet and how the polymeric backing layer is bonded to the fabric base sheet by means of calendering backing procedure.
Figure 6B:
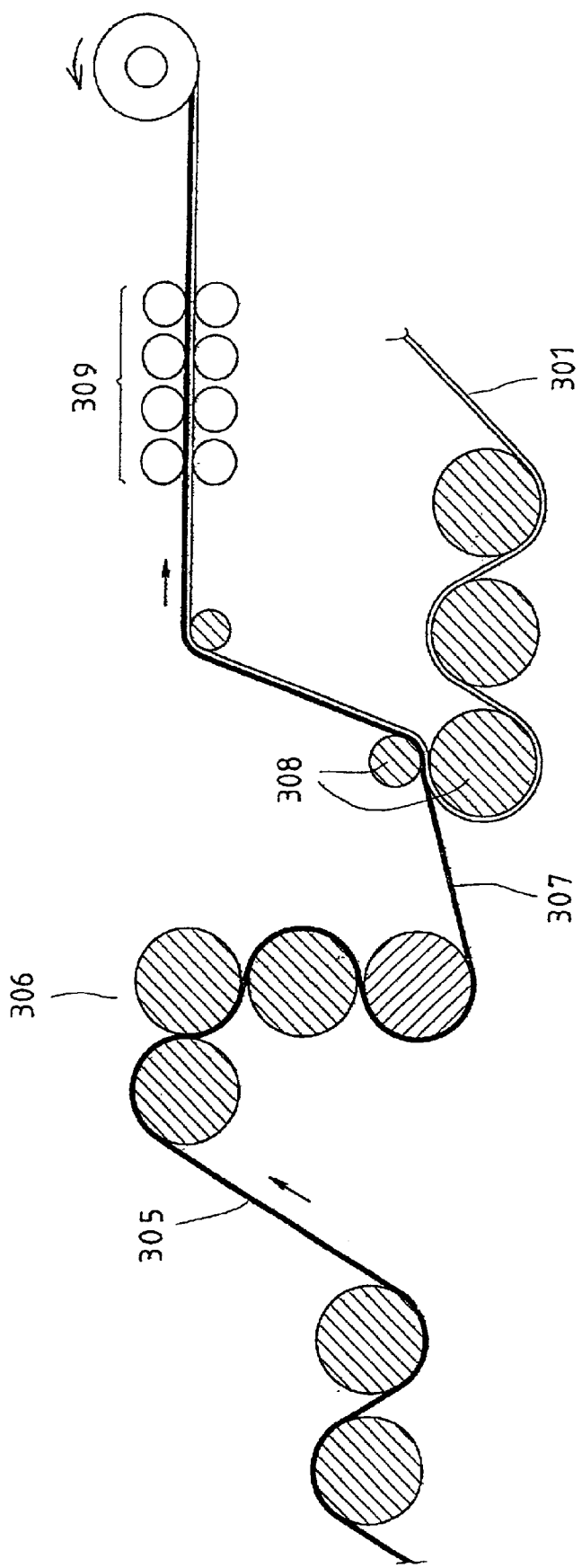

FIG. 6 shows another alternate form of the fabrication process for making the desired fabric structure. This alternate form employs a so-called calendering backing procedure. As shown in FIG. 6A, the fabric base sheet 301 is delivered over at least one applicator roller 302, which applies a viscous material 303 to one surface of the fabric base sheet 301. Further, a scraper 302a is used with each applicator roller 302, and adapted to remove excessive amount of viscous material 303 from the corresponding applicator roller 302. The viscous material 303 contains SBC (100 PHR), viscosity improver (0~120 PHR), additive (0~20 PHR), and MEK (100~500 PHR). When coated with the viscous material 303, the fabric base sheet 301 is delivered forwards through a baking oven 304, enabling the solvent in the viscous material to be volatized. When dried, the fabric base sheet 301 coated with viscous layer is rolled up for further polymeric backing layer bonding. As shown in FIG. 6B, SBC-based polymeric backing material 305 is prepared containing SBC (100 PHR) processing oil (0~120 PHR), plastics (0~100 PHR), and additive (0~20 PHR). The prepared SBC-based polymeric backing material 305 is heated to achieve a melt flow index of at least 3 g/10 min. The molten fluid of the prepared SBC-based polymeric backing material 305 is processed into a continuous sheet of SBC-based polymeric backing film 307 through a roller set 306, which is controlled at the temperature of about 90~160° C. The continuous sheet of SBC-based polymeric backing film 307 is then delivered through a pressure-bonding roller set 308 and bonded to the viscous layer of the fabric base sheet 301. After pressure bonding, the continuous sheet of SBC-based polymeric backing film 307 and the fabric base sheet 301 are fastened together, forming the a semi-finished product (fabric structure), which is cooled down through a cooling roller set 309, and then treated through a PU (urethane polymer) surface treatment (same as that shown in FIG. 4).

What is claimed is:

1. A fabric structure for making bags comprising:
   a. a fabric base sheet having a front surface and a back surface;
   b. a polymeric backing layer containing styrenic block copolymers, said polymeric backing layer having a front bonding surface bonded to the back surface of the fabric base sheet and a back surface; and
   c. a protective layer made by coating a surface treating agent onto the polymeric backing layer, said protective layer having an inner surface bonded to the back surface of the polymeric backing layer and an outer surface;
   d. wherein the surface treating agent contains a modified styrenic block copolymer material, silicone, isophthalic acid, tetraisopropyl titanate, and toluene.

2. The fabric structure according to claim 1 further comprising a viscous layer sandwiched between the fabric base sheet and the polymeric backing layer.

3. The fabric structure according to claim 2 wherein the viscous layer is made of viscous material containing styrenic block copolymer, viscosity improver, additive, and processing oil or butanone.

4. The fabric structure according to claim 1 wherein the styrenic block copolymer of the polymeric backing layer is selected from the group consisting of styrene-butadiene-styrene block copolymers, styrene-ethylene-butylene-styrene block copolymers, styrene-isoprene-Styrene block copolymers, styrene-ethylene-propylene-styrene block copolymers, and mixtures thereof.

5. The fabric structure as claimed in claim 1 wherein the surface treatment agent contains urethane polymer material.

6. The fabric structure according to claim 5 wherein a pigment is added to the urethane polymer material.

7. The fabric structure according to claim 1 wherein a pigment is added to the styrenic block copolymer surface treating agent.

8. A fabric structure for making bags comprising:
   a. A fabric base having a front surface and a back surface;
   b. A polymeric backing layer containing styrenic block copolymers, said polymeric backing layer having a front bonding surface bonded to the back surface of the fabric base sheet and a back surface; and
   c. A protective layer made by coating a surface treating agent onto the polymeric backing layer, said protective layer having an inner surface bonded to the back surface of the polymeric backing layer and an outer surface, the surface treating agent containing styrenic block copolymer material, wax and toluene;
   d. A viscous layer sandwiched between the fabric base sheet and the polymeric backing layer, the viscous layer being made of viscous material containing styrenic block copolymer, viscosity improver, additives and processing oil, or butanone.

* * * * *